(12) United States Patent
Addington

(10) Patent No.: US 9,091,392 B1
(45) Date of Patent: Jul. 28, 2015

(54) HORIZONTAL VERTICAL LAPTOP COMPUTER STAND

(71) Applicant: Wankena Laron Addington, Greensboro, NC (US)

(72) Inventor: Wankena Laron Addington, Greensboro, NC (US)

( * ) Notice: Subject to any disclaimer, the term of this patent is extended or adjusted under 35 U.S.C. 154(b) by 0 days.

(21) Appl. No.: 14/084,731

(22) Filed: Nov. 20, 2013

(51) Int. Cl.
*A47B 23/00* (2006.01)
*F16M 11/00* (2006.01)
*F16M 11/10* (2006.01)
*A47B 23/04* (2006.01)

(52) U.S. Cl.
CPC .............. *F16M 11/10* (2013.01); *A47B 23/007* (2013.01); *A47B 23/043* (2013.01); *A47B 2220/0094* (2013.01)

(58) Field of Classification Search
CPC . F16M 11/00; F16M 111/10; F16M 11/2092; A47B 23/00; A47B 23/007; A47B 2203/008; A47B 23/043; A47B 2021/0364; A47B 2220/0094; Y10S 248/918; Y10S 248/919
USPC ........... 248/444.1, 445, 447, 451, 460, 163.1, 248/166, 168, 397, 917, 918; 108/1, 8
See application file for complete search history.

(56) References Cited

U.S. PATENT DOCUMENTS

| | | | | |
|---|---|---|---|---|
| 2,546,283 A * | 3/1951 | Webster | ............................ | 108/8 |
| 3,094,802 A * | 6/1963 | Perry | ............................ | 40/610 |
| 3,664,629 A * | 5/1972 | Reed | ............................ | 248/445 |
| 4,848,710 A | 7/1989 | Newman | ........................ | 248/129 |
| 6,019,050 A | 2/2000 | Ranta | ................................ | 108/6 |
| 6,021,535 A * | 2/2000 | Baus et al. | ......................... | 5/632 |
| 6,327,982 B1 | 12/2001 | Jackson | ............................. | 108/5 |
| 7,100,517 B1 | 9/2006 | Godwin | ...................... | 108/50.01 |
| 7,258,321 B1 * | 8/2007 | Storrs | ........................... | 248/251 |
| 7,677,519 B2 * | 3/2010 | Gauer | ........................... | 248/371 |
| 2006/0022096 A1* | 2/2006 | Chan et al. | ...................... | 248/129 |
| 2006/0254470 A1 | 11/2006 | Rubin | .............................. | 108/43 |
| 2007/0012827 A1* | 1/2007 | Fu et al. | ...................... | 248/163.1 |
| 2007/0120034 A1* | 5/2007 | Sparling | ........................ | 248/458 |

* cited by examiner

*Primary Examiner* — Tan Le

(57) ABSTRACT

A laptop computer stand device to hold a laptop computer that includes a keyboard and a screen hinged to the keyboard includes a base including two feet spaced apart a sufficient distance to straddle a recumbent person and legs upstanding from the feet. A cross-member extends between the legs above the feet. A laptop keyboard support extends to one side of the cross-member including a protrusion to hook on a portion of the keyboard, and a laptop screen support extends to one side of the cross-member spaced from the laptop keyboard support to hook on the screen.

6 Claims, 11 Drawing Sheets

HORIZONTAL VERTICAL LAPTOP COMPUTER STAND

This is a non-provisional of Provisional patent application No. 61/848,431, filed Jan. 4, 2013.

BACKGROUND OF THE INVENTION

The present invention is in the technical field of laptop computer stands. More specifically, the present invention is in the technical field of portable laptop computer stand devices.

Conventional laptop computer stands are typically used in an upright, seated position, which doesn't allow the user to lay flat in a horizontal position while using a laptop computer. The upright, seated position becomes uncomfortable after a while for some laptop users. People who have back problems or who are confined to a bed have difficulty using laptop computers, due to having to be in an upright, seated position. The present invention resolves this problem by allowing the user to relax in a horizontal position while using a laptop computer.

SUMMARY OF THE INVENTION

The present invention provides a portable laptop computer stand device which allows users to lay on a bed or a horizontal surface in a horizontal position while using a laptop computer. The computer stand allows users to rotate a laptop computer about an axis at a 360 degree angle while in this stand. The portable laptop stand may be used on a bed, table top, floor, horizontal or vertical surface.

A laptop computer stand device to hold a laptop computer that includes a keyboard and a screen hinged to the keyboard includes a base including two feet spaced apart a sufficient distance to straddle a recumbent person and legs upstanding from the feet. A cross-member extends between the legs above the feet. A laptop keyboard support extends to one side of the cross-member including a protrusion to hook on a portion of the keyboard, and a laptop screen support extends to one side of the cross-member spaced from the laptop keyboard support to hook on the screen.

In one embodiment the cross-member is pivotally connected with the legs, so the legs can be folded toward the cross-member to make a compact configuration for storage.

The laptop keyboard support and laptop screen support may be pivotally mounted to the cross-member, to allow the angles of the keyboard and screen presented to the user to be adjusted for user preference. Preferably, the laptop keyboard support and laptop screen support can be clamped to the cross-member to restrain pivoting to keep the angle of the keyboard and screen presented to the user at a user's preference.

The laptop keyboard support and laptop screen support may contact their respective keyboard and screen at contact points, and at least some of the contact points are adjustable in location so the laptop computer stand device can hold the laptop computer at an angle between the laptop screen and keyboard that can be varied.

The laptop keyboard support and laptop screen support may each include a rod extending generally parallel to the cross member with the laptop keyboard support including hooks to hook to a front of a laptop keyboard and the laptop screen support including hands to support screen-side left and right edges of the screen.

The invention can also be considered as a method of using a laptop computer that includes a keyboard and a screen hinged to the keyboard including deploying a support that has a laptop keyboard support and a laptop screen support by spacing two feet of the support apart a sufficient distance so a cross-member extends between legs above the feet spaced apart enough to straddle a recumbent person, positioning the keyboard in a hook portion of the laptop keyboard support, and resting the laptop screen on the laptop screen support. The method may include the preliminary step of opening a folded laptop computer support by pivoting the feet away from a storage configuration to a use configuration.

The method may include pivoting the laptop keyboard support and laptop screen support about a horizontal axis to allow the angles of the keyboard and screen presented to the user to be adjusted for user preference. The method may include clamping part of the support to restrain pivoting to keep the angle of the keyboard and screen presented to the user at a user's preference. It may also include adjusting the laptop screen support to vary an angle between the laptop screen and keyboard.

DETAILED DESCRIPTION

Figure 1:
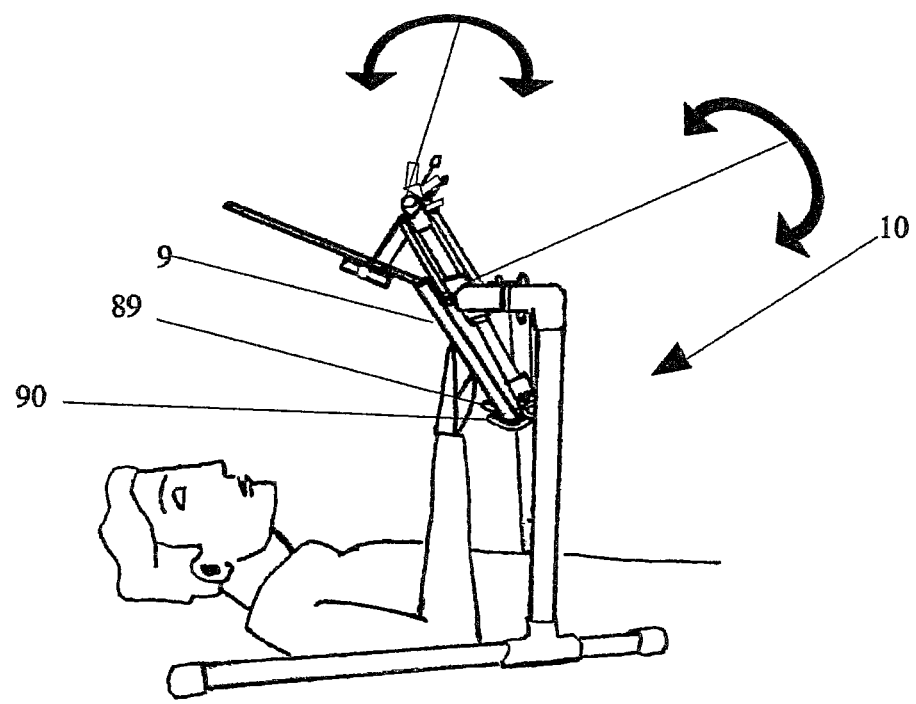
FIG. 1 is a left side view of the portable laptop computer stand device of an embodiment of the present invention in operation by a recumbent laptop computer user.
Figure 2:
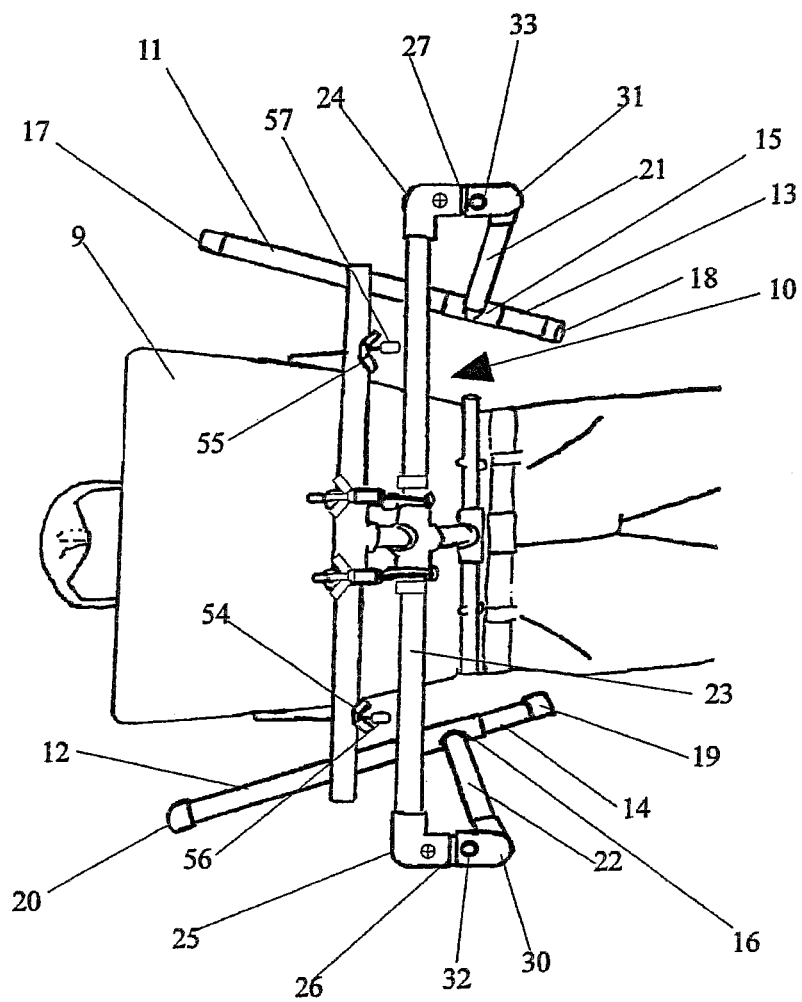
FIG. 2 is an overhead view of the portable laptop computer stand device of FIG. 1 in operation by a laptop/notebook computer user.

Referring now to the invention in more detail, in FIG. 1 and FIG. 2, there is shown a portable laptop computer stand device 10, in operation suspending a laptop computer 9 in the air. The user is able to lie in a horizontal position, and operate the laptop computer 9. As seen clearly in FIG. 1, the computer 9 is opened about 145 degrees, or could be opened to a lesser angle and still be supported by the device 10.

Figure 3:
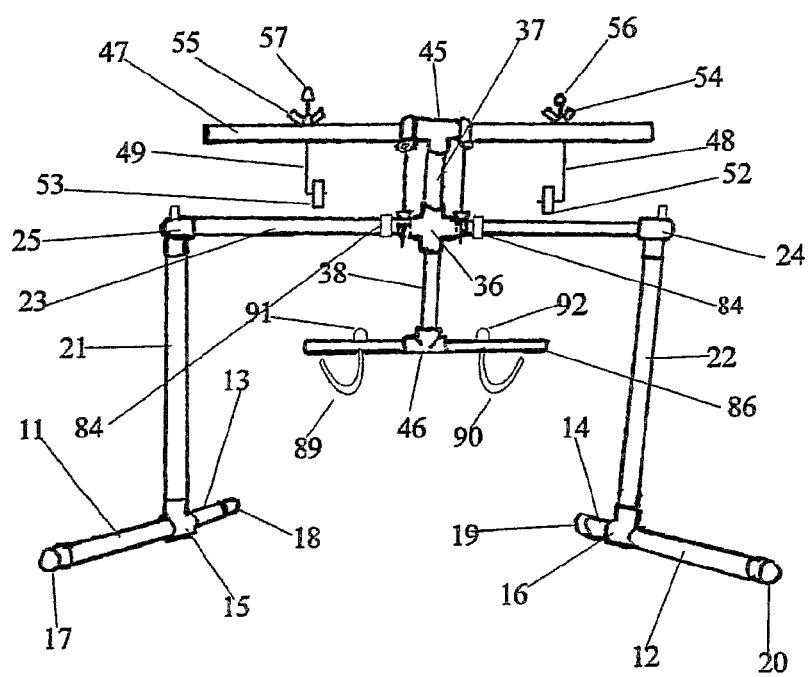
FIG. 3 is a perspective head-side view of the portable laptop computer stand device of FIG. 1.

FIG. 2 and FIG. 3 also show the portable laptop computer stand device 10. This stand includes a cross member such as horizontal axis rod 23 held in a substantially level position elevated above a horizontal surface (such as a bed), by two vertical legs 21 and 22. Each of the legs 21, 22 has an end attached to the horizontal axis rod 23, with a 90 degree angle, two-way L-shape slip connector 24, 25.

Figure 9:
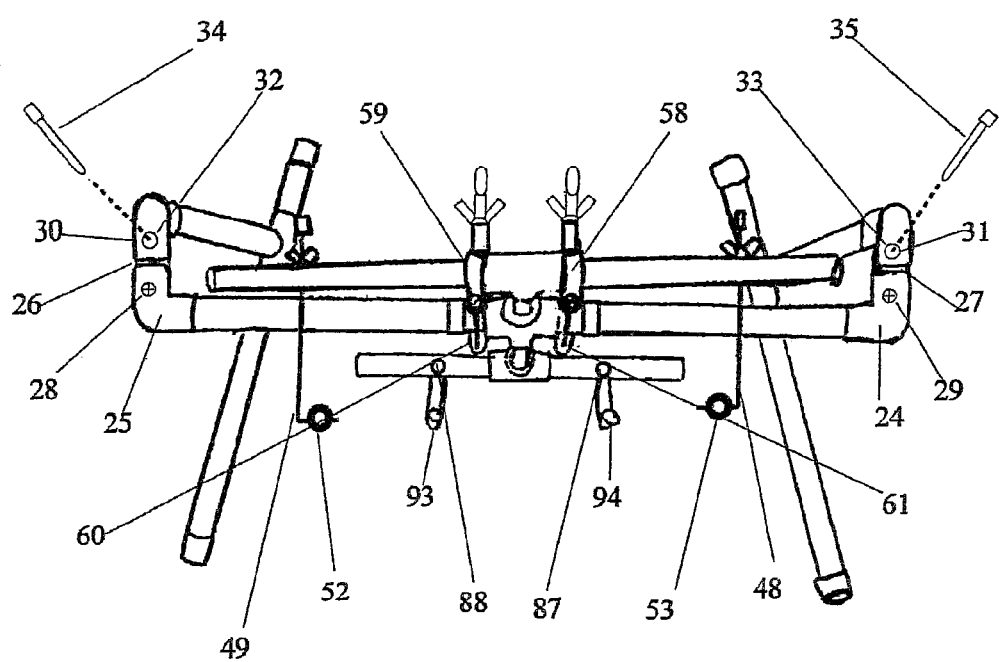
FIG. 9 is an overhead view of the portable laptop computer stand device of FIG. 1.
Figure 10:
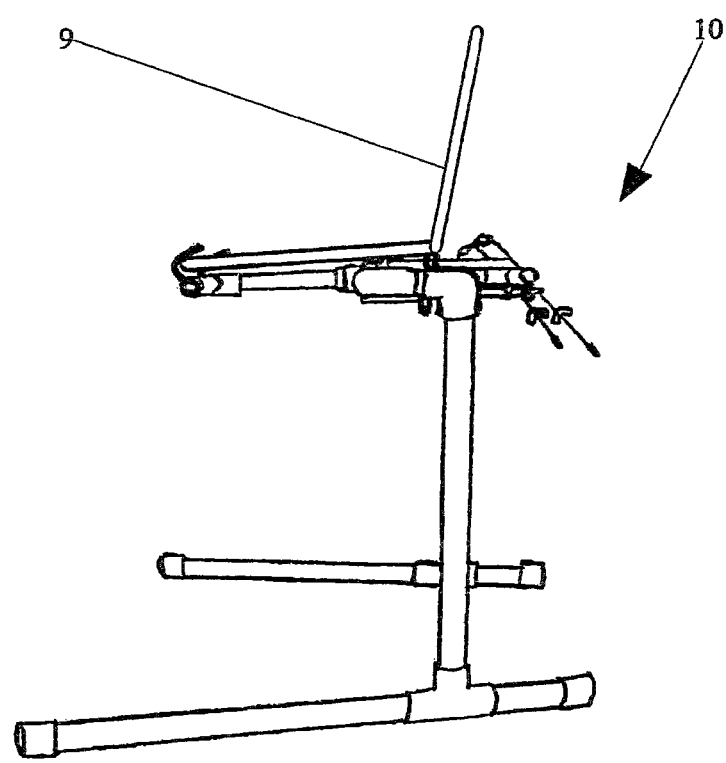
FIG. 10 is a right side view of the portable laptop computer stand device of FIG. 1 elevating a laptop computer.

As seen in FIG. 2 and FIG. 9, one of two rods 26 and 27 is inserted into each of the 90 degree angle, two-way L-shape slip connectors 24 and 25. Each of the rods 26 and 27 is held in place by a screw 28 and 29. Each screw 28 and 29 is in the middle of one of the 90 degree angle, two-way L-shape slip connectors 24 and 25. At the opposite ends of each of the vertical rods 26 and 27, are attached two-way L-shaped slip connectors 30 and 31. Each of two-way L-shaped connectors 30 and 31 has a hole 32, 33. Each hole 32 and 33 is mid-way the length of each two-way L-shaped connectors 30 and 31 and also extends through rods 26 and 27. Clevis pins 34 and 35 are inserted into holes 32 and 33, as best illustrated in FIG. 9. Each clevis pin 34 and 35 is used in order stabilize each two-way, L-shaped connector 30 and 31 in a vertical upright position. One of two vertical legs 21 and 22 is attached to each two-way, L-shaped connector 30 and 31. There are two three-way, T-shaped slip connectors 15 and 16 at the bottoms of legs 21 and 22. Each three-way, T-shaped slip connector 15 and 16 has two outward-facing holes, one facing to the left and the other facing to the right, and a third hole facing up. Each of the two legs 21 and 22 is attached to one of the vertical up-facing holes in one of the three-way, T-shaped slip connectors 15 and 16. The two vertical legs 21 and 22 are stabilized in a vertical upright position by feet made up of four horizontal legs, 11, 12, 13, and 14. Each of the legs 11, 12, 13 and 14 is connected to one of the horizontal left or right holes in each of the two T-shaped three-way slip connectors 15 and 16. The legs 11, 12, 13 and 14 can pivot in or out, by changing the orientations of the legs 21 and 22 in the up-facing holes in the three-way T-shaped slip connectors 15 and 16. The pivoting allows the user to adjust to less or more upper body space between the legs. Each of the four legs 11, 12, 13 and 14 have balancing end caps, 17, 18, 19, and 20. Each of the caps 17, 18, 19 and 20 is inserted onto the outward facing ends of legs 11, 12, 13 and 14.

Figure 5:
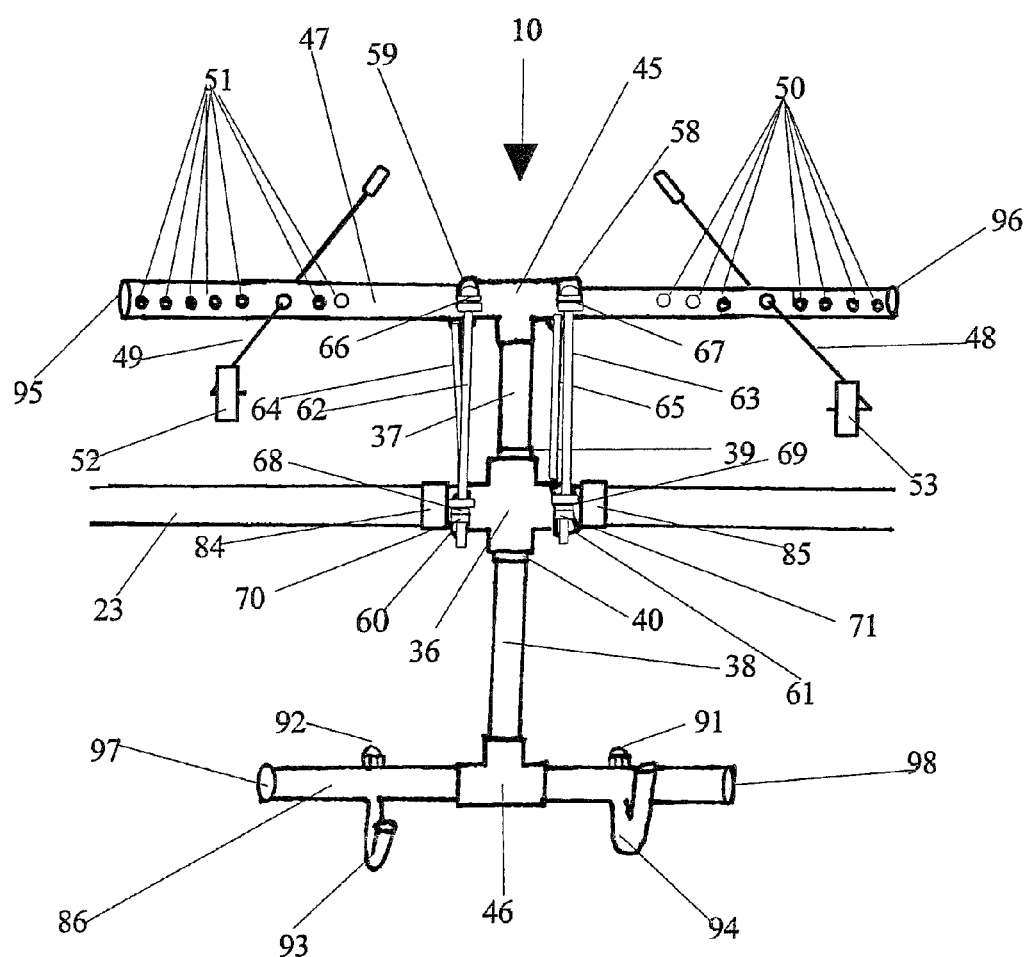
FIG. 5 is a close up view of the mid-section of the portable laptop computer stand device of FIG. 1.
Figure 6:
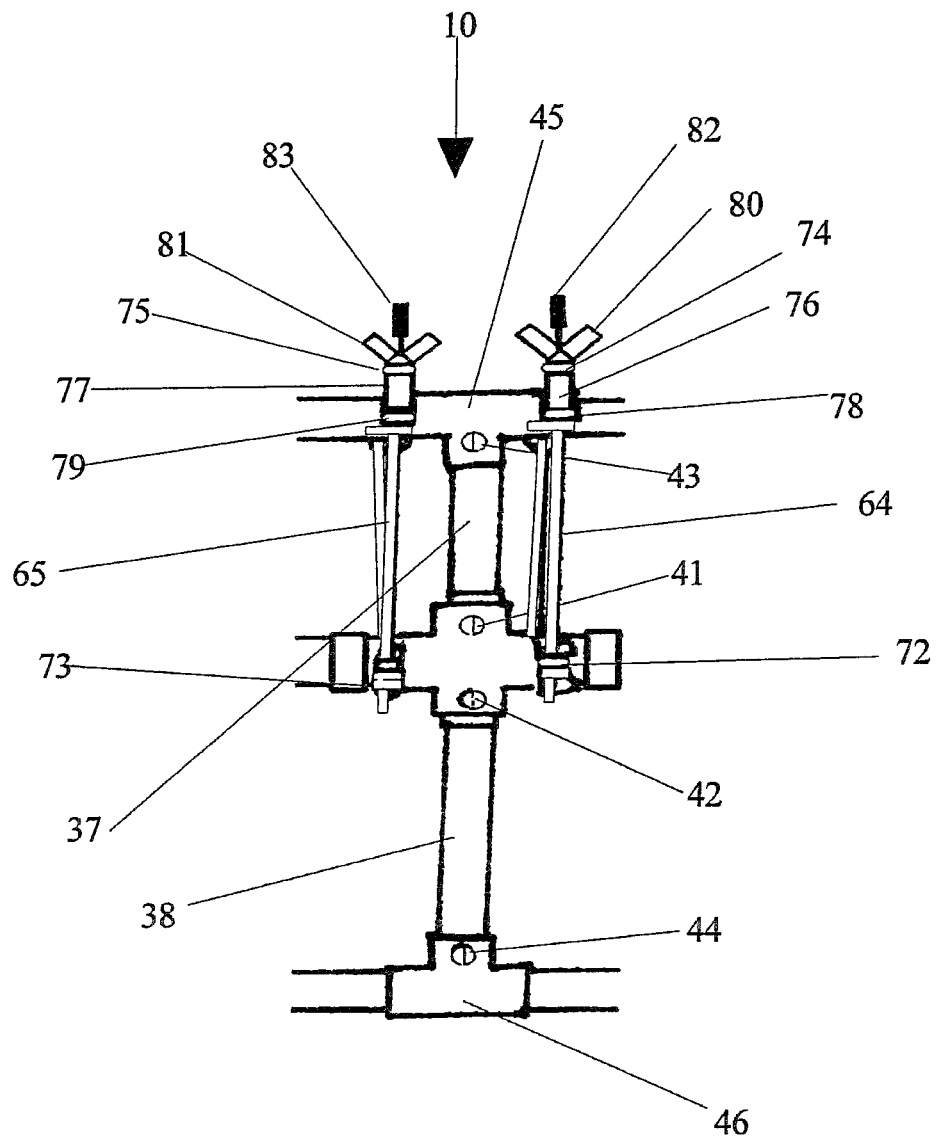
FIG. 6 is a rear close up view of the mid-section of the portable laptop computer stand device of FIG. 1.
Figures 7, 8:
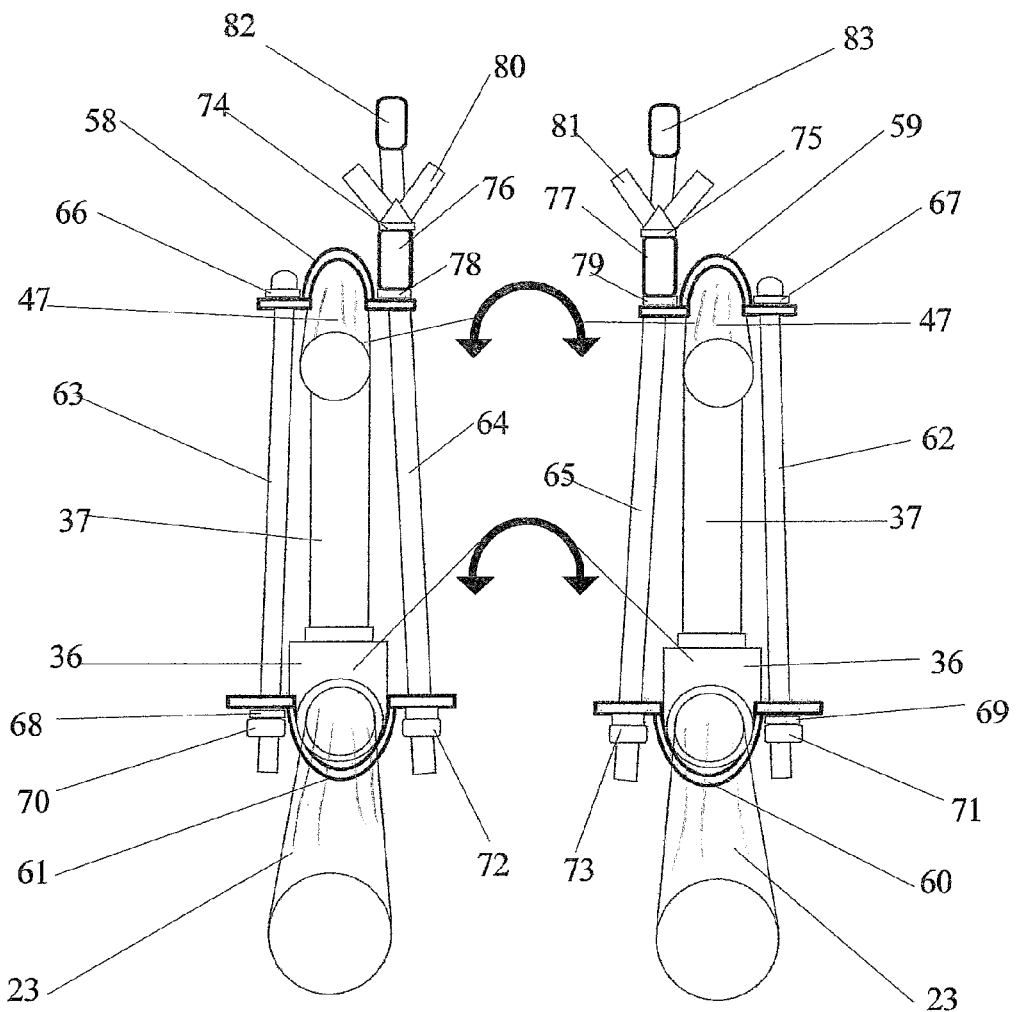
FIG. 7 is a right side, partial-sectional view of the mid-section of the portable laptop computer stand device of FIG. 1.
FIG. 8 is a left side, partial-sectional view close up of the mid-section of the portable laptop computer stand device of FIG. 1.

Now referring to FIG. 5, FIG. 7 and FIG. 8, in the center of the axis rod 23 is a four-way slip connector 36. Axis rod 23 is inserted horizontally through the center of the four-way slip connector 36, which is centered in the middle of the axis rod 23. The four-way slip connector 36 allows laptop/notebook style computers to rotate vertically up and down potentially at up to a 360 degree angle. FIG. 5 shows two rods 37 and 38 inserted into the four-way slip connector 36 at north and south ends. Each of the rods 37 and 38 has a slip connector adapter 39 and 40 attached to it. As best shown in FIG. 6, rod 37 is inserted into the vertical north end of four-way slip connector 36 with a slip connector adapter 39, and held in place by a screw 41. The second rod 38 is inserted into the south end of the four-way slip connector 36 with a slip connector adapter 40 and held in place by a screw 42. Rods 37 and 38 each have one of three-way, T-shaped slip connector 45 and 46 attached at its end. Each three-way, T-shaped slip connector 45 and 46 is held in place by one screw 43 and 44. Other fasteners, including glue, can be substituted where this specification mentions screws.

As shown in FIG. 3, FIG. 5 and FIG. 9, rod 47 is inserted through the top three-way, T-shaped slip connector 45. This three-way, T-shaped slip connector 45 is centered in the middle of rod 47. There are holes 50 and 51 in rod 47 at eight or more intervals, on both the left and right ends of rod 47, as best illustrated in FIG. 5. These elements serve as a laptop screen support in a preferred embodiment.

Figure 4:
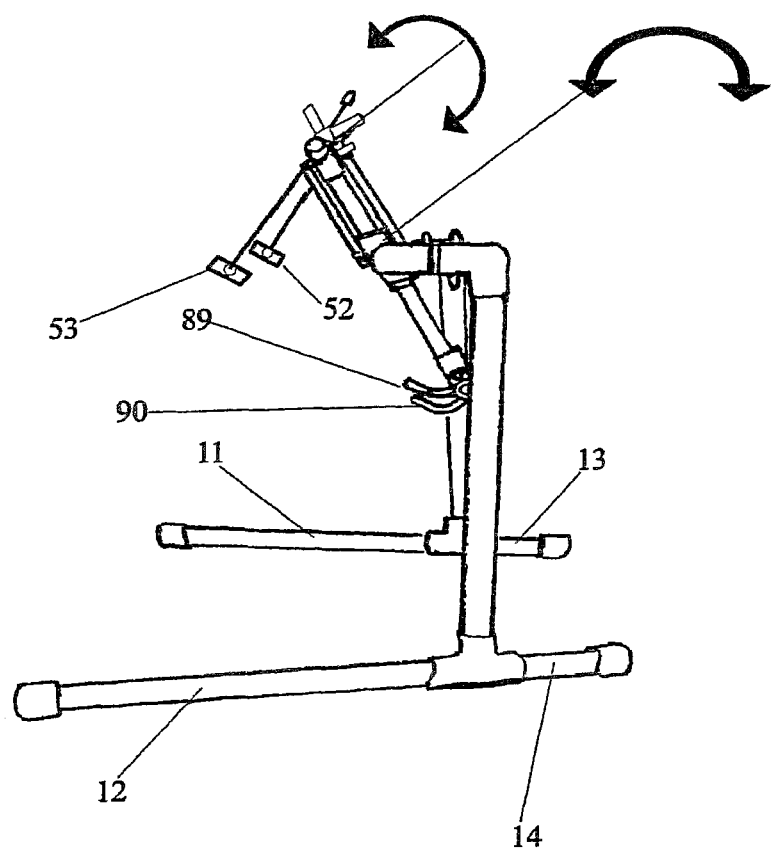
FIG. 4 is a right side view of the portable laptop computer stand device of FIG. 1 without a laptop computer in place.

FIG. 3 and FIG. 4 show two L-shaped laptop holder arms 48 and 49 inserted into one of holes 50 and 51 in rod 47. The first arm 48 is inserted into one of the holes 50 on the right side of rod 47 and the second arm 49 is inserted into one of the holes 51 on the left side of rod 47. Each L-shaped laptop holder arm 48 and 49 has a rubber arm hand 52 and 53. As best shown in FIG. 3, FIG. 4 and FIG. 9, each rubber arm hand 52 and 53 has a hole in the middle, receiving one of the L-shaped laptop holder arms 48 and 49. These L-shaped laptop holder arms 48 and 49 are adjustable and may be placed in any of the intervals holes 50 and 51 in rod 47, in order to adjust to different laptop computer screen sizes. Rod 47 can rotate, in order to adjust to different laptop screen sizes and positions, as illustrated in FIG. 1, FIG. 4, FIG. 7 and FIG. 8.

Figure 11:
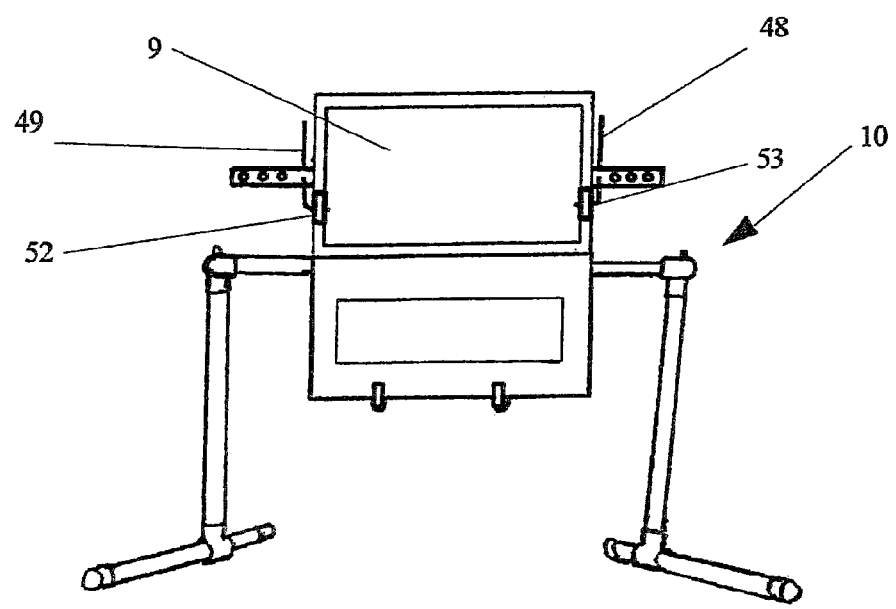
FIG. 11 is a head side view of the portable laptop computer stand device of FIG. 1.

As depicted in FIG. 2 and FIG. 3, each L-shaped laptop holder arm 48 and 49 has a wing nut 54 and 55. Each of these two wing nuts 54 and 55 screw up or down on each L-shaped laptop holder arm 48 and 49, in order to adjust the laptop holder arm's 48 and 49 arm length. Each L-shaped laptop holder arm 48 and 49 has one of two rubber end caps 56 and 57. Each end cap 56 and 57 is at the top end of each L-shaped laptop holder arm 48 and 49. Each L-shaped laptop holder arm 48 and 49 and arm hands 52 and 53 cooperate with a holder hook 89 and 90 to hold laptop computers in a stable position, as seen in FIG. 11.

As best shown in FIG. 5, FIG. 6, FIG. 7, FIG. 8 and FIG. 9, the stabilizing assembly includes two U-shaped clamps 58 and 59 that have 180 degree angle ends. Each U-shaped clamp 58, 59 has one vertical hole at each end. U-shaped clamps 58, 59 rest on rod 47, to the left and right side of the T-shaped three-way connector 45. There are two lower, U-shaped clamps 60, 61 that have 180 degree angle ends, with vertical holes one at each end. Each of the U-shaped clamps 60, 61 bears against axis rod 23, facing upward, to the left and right side of four-way slip connector 36.

FIG. 5, FIG. 7 and FIG. 8 show two bolts 62, 63 on the front-facing side of the computer stand device 10. Each bolt 62, 63 has one washer 66, 67 each. Bolts 62, 63, are inserted through the washers 66, 67. Each bolt 62, 63 is inserted through both holes in each U-shaped clamps 58, 59. Each bolt 62, 63 is inserted through one of the holes in U-shaped clamps 60, 61. Two more washers 68, 69 are inserted onto bolts 62, 63 followed by two nuts, 70, 71. Nuts 70, 71 are screwed up on the bolts 62, 63. These two nuts 70, 71 help stabilize rotation of stabilizing assembly.

Now referring to FIG. 6, FIG. 7 and FIG. 8, there are two threaded rods 64, 65. Each threaded rod 64, 65 has a lock nut 72, 73 on the south ends of the rods. These threaded rods 64, 65 are inserted from the bottom through U-shaped clamps 60, 61, then through U-shaped clamps 58, 59. Washers 74, 75 receive one of each threaded rod 64, 65. Each threaded rod 64 65 is inserted in rubber spacers 76, 77. There are two washers 78, 79 applied onto each threaded rod 64, 65. There are two wing nuts 80, 81 screwed down on the threaded rods 64, 65. These wing nuts 80, 81 are adjustable. When tightened, they work to exert friction on the connector 36 and stabilize the rotational orientation of stabilizing assembly of the laptop computer stand device 10. When they are loosened, this stabilizing assembly allows laptop computer 9 to be rotated vertically up or down about the rod 23 and then be held in a stable position by re-tightening. There are two rubber end caps 82, 83 at the top of each threaded rod 64, 65. As depicted in FIG. 5, two collar guards 84, 85 are inserted onto the axis rod 23. Each collar guard 84, 85 works as a guide to prevent the U-shaped clamps 60, 61 from moving outwardly. Those of ordinary skill in the art will readily devise alternate stabilizing assembly configurations.

As shown in FIG. 5, the lower, south-pointing rod 38 is connected to a three-way, T-shaped slip connector 46. Rod 86 making up a part of the laptop keyboard support is inserted through the three-way, T-shaped slip connector 46 and generally is centered in the middle of the three-way, T-shaped slip connector 46.

Now referring to FIG. 9, rod 86 has two holes 87, 88, to the left and right of the three-way, T-shaped slip connector 46 in rod 86. Laptop holder hooks 89, 90 are inserted through holes 87, 88, as shown in FIG. 3. Each holder hook 89, 90 has a threaded end. These hooks are suspended in place by two acorn nuts 91 and 92, as illustrated in FIG. 3 and FIG. 5.

Now referring to FIG. 5, holder hooks 89, 90, each have a rubber grip covering 93, 94. Each rubber grip covering 93, 94 covers a laptop holder hook 89, 90. These holder hooks 89, 90 engage a lower edge of a computer 9 to suspend the laptop computer 9 in the air, as illustrated in FIG. 1.

As depicted FIG. 5, two end caps 95, 96 are inserted into the left and right ends of rod 47. There are two end caps 97, 98 inserted into the left and right ends of rod 86.

As shown in FIG. 11, the portable laptop computer stand device 10 is in the configuration of a desk, in operation elevating a laptop 9 above a horizontal surface.

Figure 12:
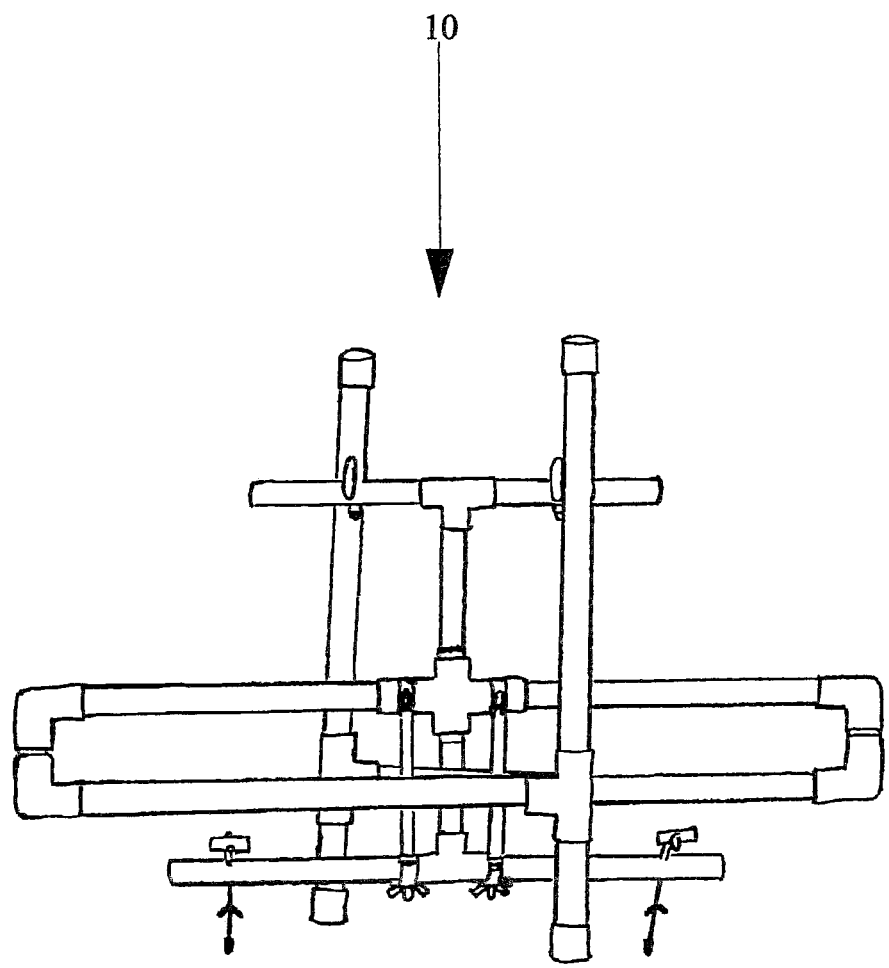
FIG. 12 is a view of the portable laptop computer stand device of FIG. 1 folded for compact storage.

Now referring to FIG. 12, there is shown the portable laptop computer stand device 10 in a folded configuration. The folded configuration is achieved by retracting the pins 34, 35 so the legs 21 and 22 can be rotated to be nearly parallel with rod 23. The nuts 80, 81 are loosed to allow the rod 45 to similarly be made nearly co-planar with the rod 23.

In further detail, still referring to the stand of FIG. 1 through FIG. 12, the horizontal vertical laptop stand, device 10, width is sufficiently wide, such as about 25" to 30" to straddle a person's torso as seen in FIG. 1. The height of the device 10 is about 15" to 20" off the base and bed. The length of the stand 10 is about 21" to 25". The length of the top rod arm holder 47 is about 18" to 23" in length. The two laptop holder arms 48, 49 are about 7" to 10" in length. The length of the bottom holder hook rod 86 is about 12" to 14" from end to end. The two laptop holder hooks 89, 90 are about 1½" to 2" in depth, and have a height of about 1½" to 1¾". The distance from top rod arm holder 47 to two bottom holder hook rods 86 is about 12" to 14". Those with ordinary skill will be able to devise alternate sizes.

The present invention as shown in the above figures is the laptop computer stand device 10. This device can be manufactured using wood, plastic, metal and the like. Further, the various components of the laptop computer stand device 10 can be made of different materials.

As can be seen, the combination of the hooks 89, 90 and rubber arm hands 52, 53 are what support the laptop directly. The adjustability of these components with respect to one another permits various laptops that only open to less than laptop sizes to be supported, particularly laptop computers that only open to less than 180 degrees between the screen and the keyboard. In addition, to the variable laptop opening permitted, the angle of presentation to the recumbent (or sitting) user can be varied by rotation of the assembly holding the hooks and arms about the horizontal axis, such as rod 23.

Also, the embodiment shown has the hooks 89, 90 of a standard length and the arms 48, 49 of adjustable length. But, the hook lengths can be adjustable, as well, and the arm lengths can be fixed.

The foregoing written description will enable one of ordinary skill to construct and utilize the invention. The described embodiments are to be considered in all respects only as illustrative and not restrictive. Therefore, the scope of the invention is not to be limited by the embodiments described above, but encompasses any and all modifications which come within the scope of the following claims.

What is claimed is:

1. A laptop computer stand device to hold a laptop computer that includes a keyboard and a screen hinged to the keyboard comprising
   a base including two feet spaced apart a sufficient distance to straddle a recumbent person and legs upstanding from the feet,
   a cross-member extending between the legs above the feet,
   a laptop keyboard support extending to one side of the cross-member including a protrusion to hook on a portion of the keyboard, and
   a laptop screen support extending to one side of the cross-member spaced from the laptop keyboard support to hook on the screen, wherein the laptop keyboard support and laptop screen support each include a rod extending generally parallel to the cross-member and the laptop keyboard support includes hooks to hook to a front of a laptop keyboard and the laptop screen support includes holding rubber arms to support screen-side left and right edges of the screen.

2. A laptop computer stand device to hold a laptop computer that includes a keyboard and a screen hinged to the keyboard as claimed in claim 1 wherein the cross-member is pivotally connected with the legs, so the legs can be folded toward the cross-member to make a compact configuration for storage.

3. A laptop computer stand device to hold a laptop computer that includes a keyboard and a screen hinged to the keyboard as claimed in claim 1 wherein the laptop keyboard support and laptop screen support are pivotally mounted to the cross-member, to allow the angles of the keyboard and screen presented to the user to be adjusted for user preference.

4. A laptop computer stand device to hold a laptop computer that includes a keyboard and a screen hinged to the keyboard as claimed in claim 3 wherein the laptop keyboard support and laptop screen support can be clamped to the cross-member to restrain the pivoting to keep the angle of the keyboard and screen presented to the user at a user's preference.

5. A laptop computer stand device to hold a laptop computer that includes a keyboard and a screen hinged to the keyboard as claimed in claim 1 wherein the laptop keyboard support and laptop screen support contact their respective keyboard and screen at contact points, and at least some of the contact points are adjustable in location so the laptop computer stand device can hold the laptop computer at an angle between the laptop screen and keyboard that can be varied.

6. A laptop computer stand device to hold a laptop computer that includes a keyboard and a screen hinged to the keyboard comprising
   a base including two feet paced apart a sufficient distance to straddle a recumbent person and legs upstanding from the feet,
   a cross-member extending between the legs above the feet, the cross-member being pivotally connected with the legs, so the legs can be folded toward the cross-member to make a compact configuration for storage,
   a laptop keyboard support extending to one side of the cross-member including a rod extending generally parallel to the cross-member and protruding hooks to hook to a front of a laptop keyboard, and
   a laptop screen support extending to one side of the cross-member including a rod extending generally parallel to the cross-member and holding rubber arms to support screen-side left and right edges of the screen to hook on the laptop screen, wherein the holding rubber arms are adjustable in location, so the laptop computer stand device can hold the laptop computer at an angle between the laptop screen and keyboard that can be varied, wherein the laptop keyboard support and laptop screen support are pivotally mounted to the cross-member, to allow the angles of the keyboard and screen presented to the user to be adjusted for user preference and the laptop keyboard support and laptop screen support can be clamped to the cross-member to restrain pivoting to keep the angle of the keyboard and screen presented to the user at a users preference.

* * * * *